United States Patent Office 2,916,507
Patented Dec. 8, 1959

2,916,507

CARBON FUNCTIONAL SILOXANE POLYESTERS

Paul M. Kerschner, Pennsauken, and Bertrand W. Greenwald, Haddonfield, N.J., assignors to Cities Service Research and Development Company, New York, N.Y., a corporation of New Jersey No Drawing. Application November 27, 1957
Serial No. 699,156

8 Claims. (Cl. 260—448.2)

This invention relates to synthetic lubricants and more particularly relates to new and improved carbon functional siloxane polyester synthetic lubricants having characteristics and properties making them particularly suitable for utilization at high temperatures. It is well known that certain comparatively high molecular weight polyesters possess properties which make them suitable for lubricating purposes. Such polyesters generally possess low pour points, a wide viscosity range and are fairly readily prepared. Various techniques are also known for limiting or altering the characteristics of such lubricants to serve particular purposes.

It has now been found, according to the present invention, that the new compounds hereinafter described possess a range of characteristics and properties making them ideally suited as lubricants. These new compounds may be described as being prepared by the esterification of a carbon functional siloxane dibasic acid with an aliphatic diol. The products of such a reaction when properly limited in chain length and stabilized as hereinafter described, are ideally suited as synthetic lubricants and hydraulic fluids.

In accordance with the present invention, the carbon functional siloxane dibasic acid is reacted with an aliphatic di-alcohol in molar ratios of acid to diol varying from 2:1 to 1:1. To provide such a product with the desired viscosity and molecular weight, the ester resulting is treated according to the present invention with a large excess of a simple monohydric alcohol which acts as an esterification chain terminator. The product resulting is then stabilized by treating the same with an agent designed to esterify residual high boiling hydroxy compounds or remove excess of reactants from the reaction product mixture.

The utilization of an excess amount of the chain terminator provides a product of tailored molecular weight and viscosity ideally suited for lubricating purposes.

It is known in the art that the reaction between equal molar amounts of a dibasic acid and diol, specifically a glycol, will generally proceed until an extremely viscous material or resin is formed due to the continuing nature of the reaction. It is the addition of an excess amount of the simple monohydric compound, preferably a low molecular weight alcohol, which limits the product to a desired molecular weight and viscosity range.

The new carbon functional siloxane polyester compounds of the present invention may be generally identified as having the following structure:

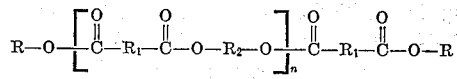

wherein R is an alkyl group having from 1 to 15 carbon atoms. $R_1$ is

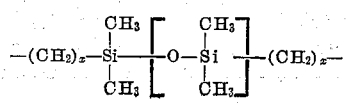

wherein $n$ is an integer from 1 to 6, $x$ is an integer from 2 to 7 and $R_2$ is a divalent hydrocarbon group having from 2 to 15 carbon atoms.

In the foregoing general formula $R_2$ represents the residue of the diol used in the esterification of the polysiloxane dibasic acid. $R_2$ is a divalent radical which preferably contains from 2 to 15 carbon atoms. The hydroxyl groups of this diol are preferably attached to terminal carbon atoms of the chain such as, for example, in the dialcohols 1,3-propane diol and 1,4-butane diol. The $R_2$ divalent hydrocarbon radical may be of straight or branched configuration and is preferably saturated. Suitable diols include the following: ethylene glycol, propylene glycol, butylene glycol, trimethylene glycol, tetramethylene glycol and pentamethylene glycol. In addition, glycols such as diethylene glycol and other polyethylene glycols may be used. Glycols containing sulphur atoms in thioether linkages may also be employed.

In the foregoing structure the group $R_1$ is the divalent radical obtained from the carbon functional siloxane dibasic acid used. Such acids are prepared by subjecting a chlorinated alkyl disiloxane to the malonic ester synthesis followed by hydrolysis and decarboxylation. When the chlorinated siloxane used includes a polysiloxane grouping, the final acid product will also include the polysiloxane structure shown.

In the acid residue structure shown, $n$ is a value of from 1 to 6. If dibasic acids of the structure shown include polysiloxane groupings of a size greater than 6, the products resulting from esterification with long chain diols will have molecular weights and viscosities outside the desired range.

The divalent radical in the polysiloxane acid residue $R_1$ above, identified as "$—(CH_2)_x—$" may be branched or straight chain configuration having from 2 to 7 carbon atoms preferably saturated. A more specific description of these siloxane dibasic acids and their manner of preparation will be found in JACS 78, 2010 (1956).

The grouping identified as R in the general formula of these new polyesters as shown above, is the residue of the monohydric chain terminating alcohol used. This alkyl group will have from 1 to 15 carbon atoms depending on the particular alcohol selected as chain terminator. While long chain monohydric alcohols can be used for the purposes of the present invention, it is preferred that the alcohol will have from 1 to 15 carbon atoms and preferably be of saturated configuration. The alcohol may be branched or straight chain. Typical examples of suitable chain terminating alcohols are ethyl, butyl, isobutyl, propyl, amyl, isoamyl, hexyl, heptyl, n-octyl, 2-ethylhexyl, 2-ethylbutyl, cetyl, 2-butyloctyl, capryl and lauryl. The so-called "oxo" alcohol prepared by the reaction of carbon monoxide and hydrogen upon olefins including such materials as diisobutylene and higher weight mono-olefins may be employed. In addition, ether alcohols such as methyl Cellosolve, ethyl Cellosolve, hexyl Cellosolve and other similar ether alcohols may be used as chain terminators.

In preparing the new carbon functional siloxane polyesters of the present invention, it is preferred that the two step reaction be used in which the selected carbon functional siloxane dibasic acid is first reacted with the selected diol under esterification conditions with the polyester product thereafter being limited in chain length by the addition of the excess monohydric chain terminating compound. In carrying out the esterification reaction between the dibasic acid and diol, water of esterification is removed from the reaction zone by a trap or other suitable means. This is accomplished by the use of an azeotrope forming solvent such as benzene, toluene, xylene or the like. The reactant mixture is refluxed at a temperature suitable to distill over the azeotrope. Such temperature is normally below the boiling point of the diol used in esterifying the acid. The reaction can be shortened in period of time by introducing into the reaction mixture a small amount of an acid catalyst. Suitable acid catalysts for this purpose are p-toluene sulfonic acid, sulphuric acid or phosphoric acid. The non-volatile p-toluene sulfonic acid is preferred.

After the esterification reaction is substantially complete, an excess of the monohydric chain stopper is added together with sufficient azeotrope forming solvent and reflux again conducted until the recovery of the theoretical amount of water is accomplished or until a neutralization number test produces a value of about 4 indicating completion of the esterification reaction.

If the reaction is to be carried out in a single stage, the dibasic acid diol and chain terminator may be dissolved in the desired ratio in an azeotrope forming solvent and reflux carried out in the manner described above until the theoretical amount of water of esterification has been recovered indicating completion of the reaction. While such a technique provides a suitable yield of product according to the present invention, the two stage process is preferred, in which the diacid and diol are first reacted with the resulting product being further reacted with the monohydric terminator.

As has previously been indicated, the ratio of acid to diol may vary from 2:1 to 1:1. The lower limit in acid to diol ratio of 1:1, which would normally result in the production of a resinous product, is only possible if an excess amount of monohydric chain terminator is used. The molar excess of terminator should be greater than 10% by weight and preferably in excess of 50% but generally not greater than about 700%.

After the recovery of the final polyester product, which incidentally will be a mixture with the predominant product being the carbon functional siloxane polyester identified in the general formula above. A product which is to be used for lubricating purposes will be made more suitable for this purpose if the product is treated with an adsorption agent such as florosil, fuller's earth or mixtures of these two to stabilize the product, preferably, however, treating the product with a simple monobasic acid such as acetic, propionic or butyric acid to remove residual high boiling hydroxy compounds.

After the stabilization treatment unreacted excess alcohol and solvent are removed by distillation at reduced pressure. The polyester product is then washed with water, neutralized with a weak alkali such as 10% sodium carbonate solution and again washed with water to remove any free unreacted acid and catalyst. The resulting polyester product is then dried by heating to 120° C. at a reduced pressure.

In order to more fully understand the manner of preparing the new compounds of the present invention, the following specific examples are provided:

EXAMPLE 1

To 19.5 grams (.070 mol) of 4,4,6,6 tetramethyl, 4,6 disila 5 oxa nonanedioic acid, 2.2 grams (.035 mol) of ethylene glycol is added in the presence of 118 grams of toluene solvent and 0.05 gram of p-toluene sulfonic acid esterification catalyst. The reaction mixture is heated to reflux temperature and after recovery of the theoretical amount of water of esterification, approximately 10.3 grams, a 100% excess of n-butanol is added. Reflux is again continued until the neutralization number of the mixture is found to be less than 4.

The unreacted excess butanol and toluene are then removed from the reaction zone (a 500 ml. three-neck round bottom flask provided with a mechanical stirrer, thermometer, and reflux condenser fitted with a water trap) by distilling at reduced pressure. The polyester product is then washed with water, washed with 10% sodium carbonate solution, and again washed with water. The final polyester product desired is recovered by raising the distillation pot temperature to about 173° C. at a pressure of 160 microns of mercury. The properties of this product are found in Table II.

EXAMPLE 2

Following the procedure set forth in Example 1 above, 58 grams (0.2 mol) of 4,4,6,6 tetramethyl 4,6 disila 5 oxa nonanedioic acid is reacted with 8.3 grams (.133 mol) of ethylene glycol in the presence of 175 grams of toluene solvent and 0.58 gram of p-toluene sulfonic acid. After esterification is substantially complete, 48 grams (0.65 mol, a 300% excess) of n-butanol is added and reflux continued until the neutralization number of the mixture is found to be less than 4. After purification and recovery, the final product analyzed as shown in Table II.

EXAMPLE 3

Following the procedure set forth in Examples 1 and 2 above, 70.4 grams (0.2 mol) of 4,4,6,6,8,8 hexyl methyl, 4,6,8 trisila, 5,7 dioxa decanedioic acid is esterified in the presence of about 150 grams of xylene and .6 gram of p-toluene sulfonic acid with 10.6 grams (0.1 mol) of diethylene glycol. 35.2 grams (0.4 mol) 100% excess of amyl alcohol is used as chain stopper. To stabilize this product 8.8 grams (0.1 mol) of butyric acid is used.

EXAMPLE 4

Following the preparation previously outlined, 58 grams (0.2 mol) of 4,4,6,6 tetramethyl, 4,6 disila, 5 oxa nonanedioic acid is esterified in the presence of 175 grams of toluene and 0.58 gram of p-toluene sulfonic acid catalyst with 10 grams (.1625 mol) of ethylene glycol. 40 grams (0.54 mol, a 600% excess) of n-butanol is used as chain stopper. Analysis of the recovered product is shown in Table II.

EXAMPLE 5

27.8 grams of 4,4,6,6 tetramethyl, 4,6 disila, 5 oxa nonanedioic acid is esterified with 5.3 grams (.05 mol) of diethylene glycol in the presence of 86 grams of toluene and 0.293 grams of p-toluene sulfonic acid. 19.2 grams (0.3 mol, a 200% excess) of n-butanol is added as an esterification chain terminator. The reaction mixture is recovered according to the method previously described and provides a product having the properties shown in Table II.

EXAMPLE 6

To 85.2 grams (0.2 mol) of 4,4,6,6,8,8,10,10 octamethyl, 4,6,8,10 tetrasila, 5,7,9 trioxa tridecanedioic acid, 7.6 grams (0.1 mol) of propylene glycol is added. 120 grams of toluene solvent and 0.05 gram of p-toluene sulfonic acid is added to the acid mixture. Reflux is then undertaken at a temperature of about 112° C. for a period of approximately 8 hours. After recovery of the theoretical amount of water indicating completion of the esterification reaction, approximately 52.0 grams (0.4 mol, 100% excess) of 2-ethyl hexyl alcohol is added. Reflux is again continued with water of esterification being trapped as an azeotrope until a neutralization number of less than 4 is obtained.

Unreacted 2-ethyl hexyl and toluene are then removed from the reaction zone by distillation at reduced pressure. The polyester product is then washed with water, washed with dilute sodium carbonate solution and again washed with water. The final polyester product is recovered by raising the distillation pot temperature to about 170° C. at a pressure of about 150 microns of mercury.

EXAMPLE 7

According to the method previously described, 27.8 grams (0.1 mol) of 4,4,6,6 tetramethyl, 4,6 disila, 5 oxa nonanedioic acid is refluxed under esterification conditions with 8.48 grams (0.08 mol) of diethylene glycol. 24 grams (0.32 mol, a 700% excess) of n-butanol is used as a chain stopper. An analysis of the recovered product is shown in Table II.

EXAMPLE 8

In a manner similar to that previously described, 73.2 grams (0.10 mol) of 7,7,9,9,11,11,13,13,15,15,17,17,19,19 tetradecamethyl, 7,9,11,13,15,17,19 heptasila, 8,10,12,14,16,18 hexaoxa, pentacosanedioic acid is reacted with 8.48 grams (0.08 mol) of diethylene glycol. The chain length of this compound is terminated by adding 24 grams (0.32 mol, a 700% excess) of n-butanol. The product obtained is a polyester similar to that previously described and analyzed.

EXAMPLE 9

As previously described, 27.8 grams of 4,4,6,6 tetramethyl, 4,6 disila 5 oxa nonanedioic acid are reacted with 13.9 grams (0.08 mol) of decamethylene glycol. The chain of the resulting compound is terminated by the addition of 24 grams (0.32 mol, a 200% excess) of n-butanol.

As previously indicated, one of the important features of the present invention is to provide stable polyesters having properties making them suitable as synthetic lubricants and hydraulic fluids by utilizing an excess of a simple monohydric alcohol as an esterification chain terminator. The effectiveness of the excess terminator in limiting molecular weight of the final product will be apparent from Table I which follows.

Table I

THE EFFECT OF EXCESS SIMPLE MONOALCOHOL (ESTERIFICATION CHAIN TERMINATOR) ON THE MOLECULAR WEIGHT AND VISCOSITY AT 100° F. OF THE POLYESTER

| Example No | 1 | 2 | 4 | 5 | 7 |
|---|---|---|---|---|---|
| Dibasic acid | 4,4,6,6 tetramethyl, 4,6 disila 5 oxa nonanedioic acid | | | | |
| Glycol | (1) | (1) | (1) | (2) | (2) |
| Chain terminator | (3) | (3) | (3) | (3) | (3) |
| Percent excess terminator | 100 | 300 | 600 | 200 | 700 |
| Ratio acid to glycol | 2:1 | 1.50:1 | 1.25:1 | 2:1 | 1.25:1 |
| Mol weight (theoretical) | 694 | 998 | 1,606 | 738 | 1,782 |
| Mol weight (found) | 476 | 435 | 511 | 420 | 534 |
| Vis. at 100° F., CS | 9.63 | 8.54 | 9.30 | 8.10 | 17.0 |

[1] Ethylene.
[2] Diethylene.
[3] n-Butanol.

In the foregoing table, a contrast is provided between the theoretical molecular weight expected from the reactants specified in the various examples and the molecular weight actually found. In every case it will be noted that the use of excess alcohol as a chain terminator provided an effective limitation on the molecular weight of the final polyester product. This result is most important since polyesters of high molecular weight having resinous characteristics are not suitable as lubricants or hydraulic fluids. On the other hand, limitation of molecular weight according to the method described provides final products having viscosities and other characteristics, including pour point, fire and flash points, well within conventional specification standards.

The suitability of the polyester compounds of the present invention as synthetic lubricants will be evident from a comparison of the detailed analysis of these products as shown in Table II with the following specification:

MIL-L-7808 SPECIFICATION

| | |
|---|---|
| Viscosity at 210° F., centistokes | 3.0 min. |
| Viscosity at —65° F., centistokes | 13,000 max. |
| Pour point, ° F. | —75 max. |
| Flash point, ° F. | 400 min. |
| Evap. loss, percent at 400° F. | 35 max. |
| Ryder gear scuff load, lbs./in. | 1870 min. |

The characteristics and properties of selected polyesters, in particular those prepared according to Examples 1, 2, 4, 5 and 7, are set forth in Table II which follows:

Table II

| Example No | 1 | 2 | 4 | 5 | 7 |
|---|---|---|---|---|---|
| Dibasic acid | 4,4,6,6 tetramethyl, 4,6 disila 5 oxa nonanedioic acid | | | | |
| Glycol | (1) | (1) | (1) | (2) | (2) |
| Chain terminator | (3) | (3) | (3) | (3) | (3) |
| Percent excess terminator | 100 | >300 | >600 | >200 | 700 |
| Ratio acid to glycol | 2:1 | 1.50:1 | 1.25:1 | 2:1 | 1.25:1 |
| Mol weight (theoretical) | 694 | 998 | 1,606 | 738 | 1,782 |
| Mol weight (found) | 476 | 435 | 511 | 420 | 534 |
| Percent silica (found) | 15.3 | 15.5 | 16.0 | 15.1 | 15.4 |
| Percent silica (theoretical) | 16.1 | 16.8 | 17.4 | 15.2 | 15.7 |
| Saponification number | 278 | 293 | 296 | 278 | 281 |
| Vis. at —65° F | 2,400 | 2,000 | 2,400 | 1,200 | 3,600 |
| Vis. at 100° F., CS | 9.63 | 8.54 | 9.30 | 8.10 | 17.03 |
| Vis. at 210° F., CS | 2.98 | 2.61 | 2.81 | 2.62 | 4.66 |
| Viscosity index | 180 | 154 | 163 | 168 | 198 |
| Flash point, ° F | | 380 | | | |
| Fire point, ° F | | 415 | | | |
| Pour point, ° F | | <—75 | <—65 | | |

[1] Ethylene.
[2] Diethylene.
[3] n-Butanol.

A comparison of the data set forth in Table II with that of the required characteristics described in Military Specification 7808 above, will indicate the general suitability of the products of this invention for aircraft turbine engines for which the specification was designed. It will be noted that while the products of Examples 2 and 5 possess viscosities at 210, slightly lower than the required minimum viscosity, other characteristics fall within the required range.

When used as synthetic lubricants, it is, of course, understood that the polyesters of the present invention may be blended with various mineral oil bases and that various additives, such as load bearing, anti-oxidants, dyes, metal deactivators, color stabilizers, anti-corrosion agents. Such materials may be added in a conventional manner and amount to tailor the product to the desired characteristics.

When employed in mineral oil compositions, these new polyesters may be mixed with distillates derived from paraffinic, naphthenic, aliphatic or mixed base crudes. Blended compositions utilizing these new compounds may also include various additives such as anti-oxidants, pour point depressants, thickeners, soaps, dyes and the like.

While the invention has been described with reference to particular examples and embodiments thereof, it will be understood, of course, that changes, substitutions and modifications may be made therein without departing from its scope.

What is claimed is:

1. A synthetic lubricant consisting essentially of a carbon functional siloxane polyester formed by the reaction of a polysiloxane dibasic acid having the structure

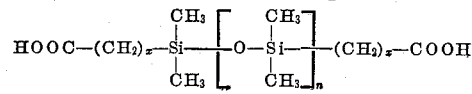

wherein $n$ is an integer from 1 to 6 and $x$ is an integer from 2 to 7, with a diol having from 2 to 15 carbon atoms, chain stopped with an excess amount of an aliphatic monohydric alcohol having from 1 to 15 carbon atoms, said acid and diol being reacted in a molar ratio of from 2:1 to 1:1.

2. A synthetic lubricant consisting essentially of a carbon functional siloxane polyester formed by the reaction of a polysiloxane dibasic acid having the structure

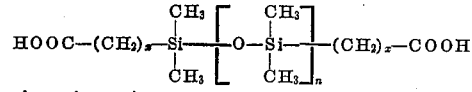

wherein $n$ is an integer from 1 to 6 and $x$ is an integer from 2 to 7, with an aliphatic diol having from 2 to 15 carbon atoms, and chain stopped with an aliphatic monohydric alcohol having from 1 to 15 carbon atoms, said monohydric alcohol being added in an excess of at least 50% by weight, said acid and diol being reacted in the molar ratio of from 2:1 to 1:1.

3. A synthetic lubricant consisting essentially of a carbon functional siloxane polyester formed by the reaction of a polysiloxane dibasic acid having the structure

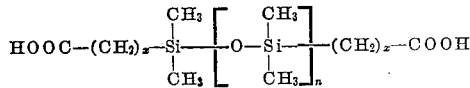

wherein $n$ is an integer from 1 to 6 and $x$ is an integer from 2 to 7, with an aliphatic diol having from 2 to 15 carbon atoms, and chain stopped with an aliphatic monohydric alcohol having from 1 to 15 carbon atoms, said monohydric alcohol being added in an excess of at least 50% by weight, said acid and diol being reacted in the molar ratio of from 2:1 to 1:1, with the final polyester product resulting being stabilized with a low molecular weight monocarboxylic acid having from 1 to 8 carbon atoms.

4. A synthetic lubricant consisting essentially of a carbon functional siloxane polyester formed by the reaction of a polysiloxane dibasic acid having the structure

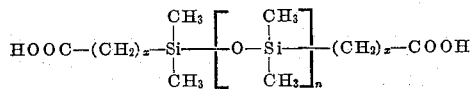

wherein $n$ is an integer from 1 to 6 and $x$ is an integer from 2 to 7, with ethylene glycol at a molar ratio of acid to glycol of about 2:1 to 1:1, with the ester being formed thereby having added thereto a 100% excess of a monohydric aliphatic alcohol having from 1 to 15 carbon atoms with the final polyester product being stabilized by esterifying residual reactants with a low molecular weight monocarboxylic acid having from 1 to 8 carbon atoms.

5. A synthetic lubricant consisting essentially of a carbon functional siloxane polyester formed by the reaction of a siloxane dibasic acid having the formula

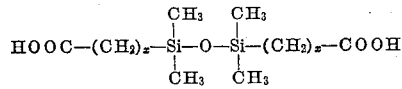

wherein $x$ is an integer from 2 to 7, with an aliphatic diol having from 2 to 15 carbon atoms and chain stopped with an aliphatic monohydric alcohol having from 1 to 15 carbon atoms, said monohydric alcohol being added in an excess of at least 50% by weight, and said dibasic acid and diol being reacted in the molar ratio of from 2:1 to 1:1.

6. A synthetic lubricant consisting essentially of a carbon functional siloxane polyester formed by the reaction of a polysiloxane dibasic acid having the structure

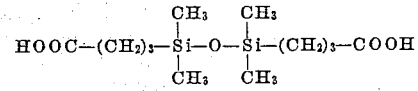

with ethylene glycol in the molar ratio of from 2:1 to 1:1 and chain stopping the resulting ester with an excess of n-butanol, said n-butanol being added in an amount of at least 50% by weight.

7. A synthetic lubricant consisting essentially of a carbon functional polyester formed by the reaction of a polysiloxane dibasic acid having the structure

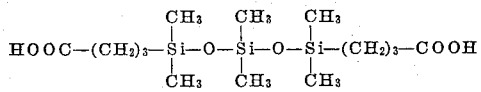

with diethylene glycol in a molar ratio of from 2:1 to 1:1, the resulting ester being chain stopped by reacting the same with a 50% excess of amyl alcohol.

8. A synthetic lubricant consisting essentially of a carbon functional siloxane polyester formed by the reaction of a polysiloxane dibasic acid having the structure

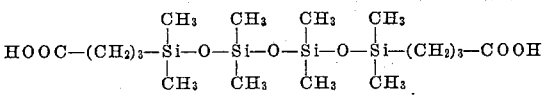

with propylene glycol in a molar ratio of about 1:1 with the resulting ester being reacted with at least 50% excess by weight of 2-ethyl hexanol.

References Cited in the file of this patent
UNITED STATES PATENTS

| | | |
|---|---|---|
| 2,570,090 | Barry et al. | Oct. 2, 1951 |
| 2,721,856 | Sommer | Oct. 25, 1955 |
| 2,723,987 | Speier | Nov. 15, 1955 |

OTHER REFERENCES

"Polyesters and Their Applications," by Bjorksten Research Lab. Inc., Reinhold Publ. Corp., N.Y., publisher (1956), pp. 161 and 170.

UNITED STATES PATENT OFFICE
Certificate of Correction

December 8, 1959

Patent No. 2,916,507      Paul M. Kerschner et al.

It is hereby certified that error appears in the printed specification of the above numbered patent requiring correction and that the said Letters Patent should read as corrected below.

Column 1, lines 69 to 72, for that portion of the formula reading

Signed and sealed this 14th day of June 1960.

[SEAL]

Attest:
KARL H. AXLINE,
*Attesting Officer.*

ROBERT C. WATSON,
*Commissioner of Patents.*